United States Patent
Hudson, Jr.

(10) Patent No.: US 7,102,641 B2
(45) Date of Patent: Sep. 5, 2006

(54) METHOD, DATA PROCESSING SYSTEM, AND COMPUTER PROGRAM PRODUCT FOR DETERMINING INVERSION EDGES FOR A CYCLIC COMPOUND DIRECTED GRAPH

(75) Inventor: Thomas Randall Hudson, Jr., Cary, NC (US)

(73) Assignee: International Business Machines Corporation, Armonk, NY (US)

(*) Notice: Subject to any disclaimer, the term of this patent is extended or adjusted under 35 U.S.C. 154(b) by 196 days.

(21) Appl. No.: 10/811,742

(22) Filed: Mar. 29, 2004

(65) Prior Publication Data

US 2005/0212818 A1  Sep. 29, 2005

(51) Int. Cl.
*G06T 11/20* (2006.01)
(52) U.S. Cl. ...................................... 345/440
(58) Field of Classification Search ................ 345/440, 345/441, 442
See application file for complete search history.

(56) References Cited

U.S. PATENT DOCUMENTS

| | | | |
|---|---|---|---|
| 3,916,387 A | 10/1975 | Woodrum | 340/172.5 |
| 4,953,106 A | 8/1990 | Gansner et al. | 364/521 |
| 5,978,588 A * | 11/1999 | Wallace | 717/159 |
| 6,189,116 B1 | 2/2001 | Mongan et al. | 714/38 |
| 6,381,609 B1 * | 4/2002 | Breitbart et al. | 707/103 R |
| 6,476,814 B1 | 11/2002 | Garvey | 345/440 |
| 6,499,037 B1 | 12/2002 | Breitbart et al. | 707/103 R |
| 6,848,100 B1 * | 1/2005 | Wu et al. | 717/157 |

* cited by examiner

*Primary Examiner*—Mark Zimmerman
*Assistant Examiner*—David Chu
(74) *Attorney, Agent, or Firm*—Duke W. Yee; Martin J. McKinley; James O. Skarsten

(57) ABSTRACT

A method, computer program product, and a data processing system for determining an edge for inversion in a cyclic compound directed graph. A plurality of graph nodes of a graph are evaluated for generation of a first node order subset pair. A determination that the graph requires a recursive evaluation for completing node ordering of the plurality of graph nodes is made. The graph is divided into a plurality of graph partitions, and respective node order subset pairs are generated for the graph partitions.

18 Claims, 14 Drawing Sheets

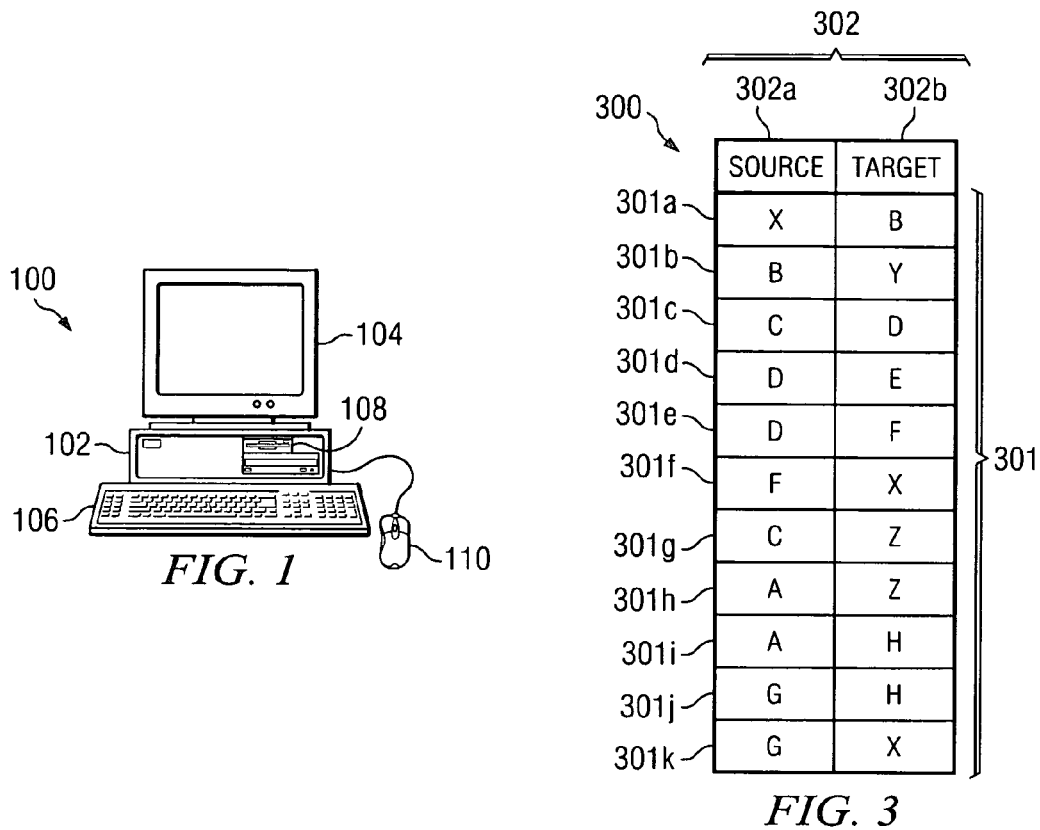
FIG. 1
FIG. 3
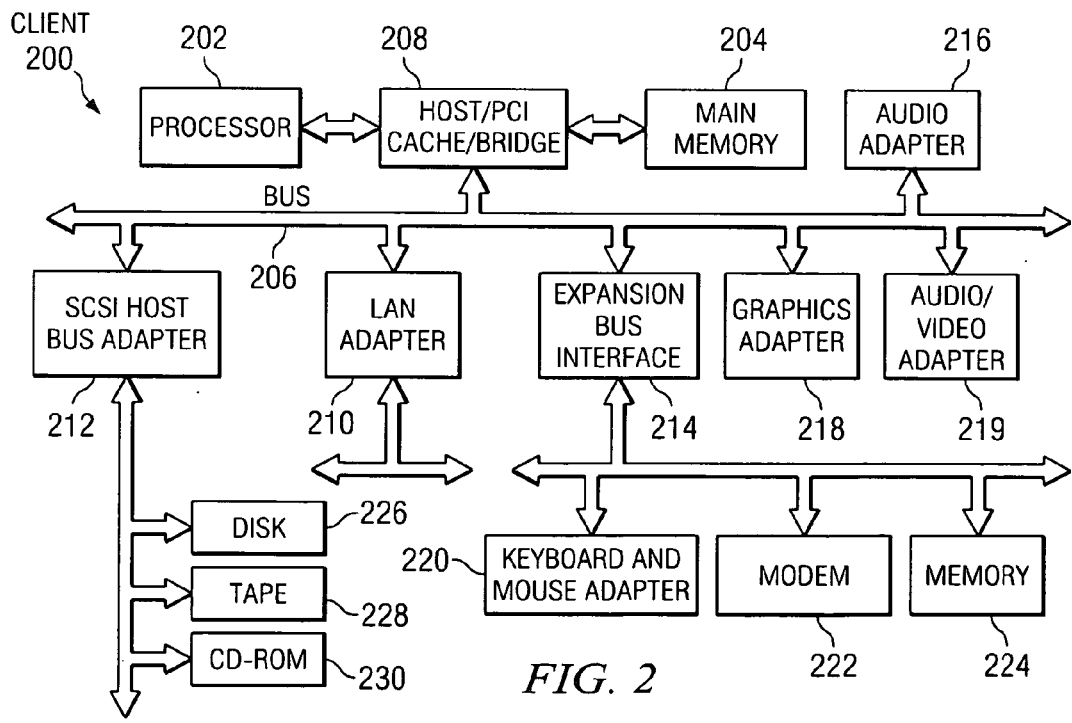
FIG. 2

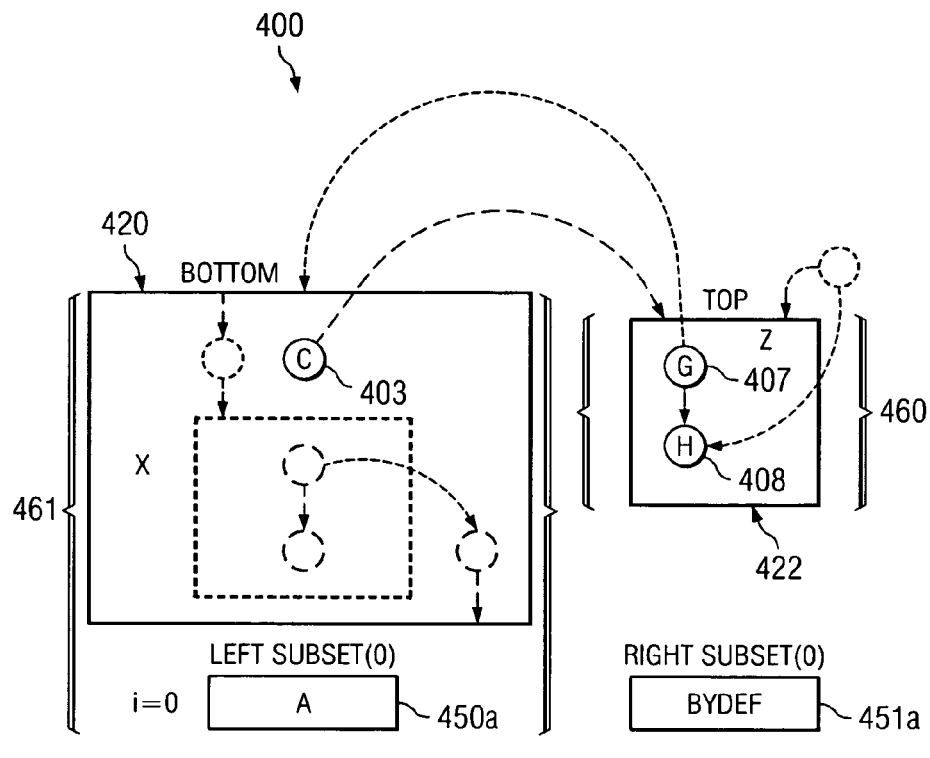
*FIG. 6I*
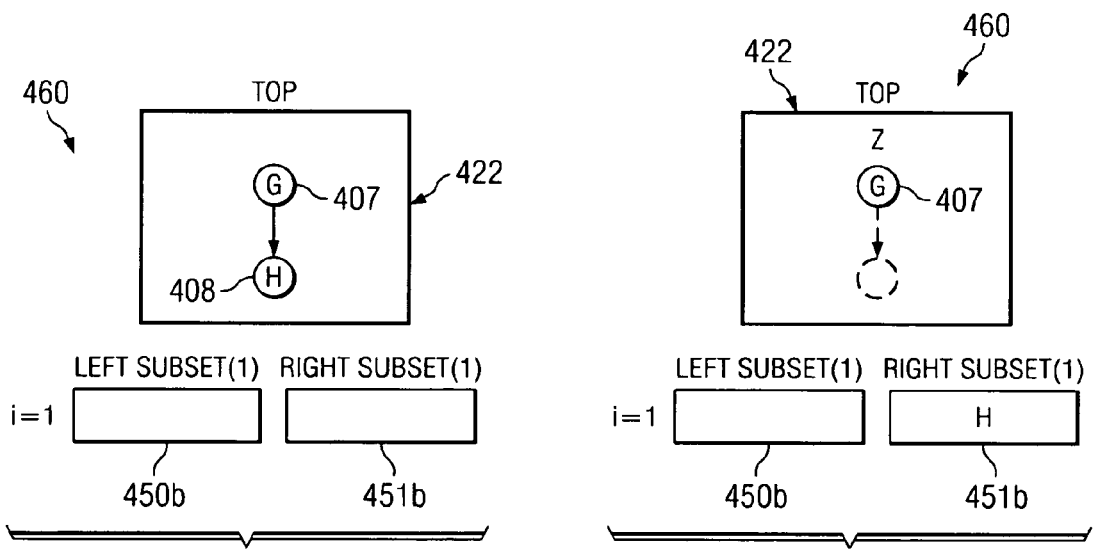
*FIG. 6J*    *FIG. 6K*

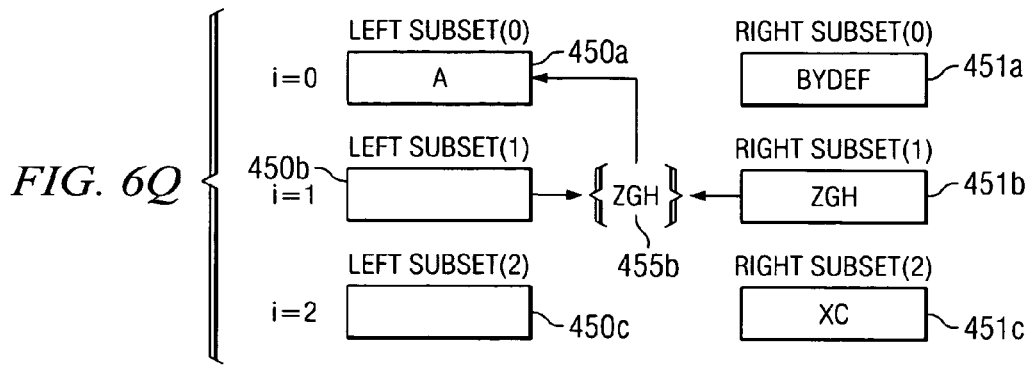
FIG. 6Q
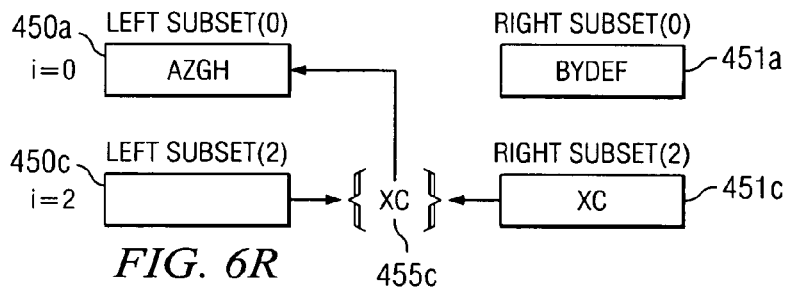
FIG. 6R
FIG. 6S
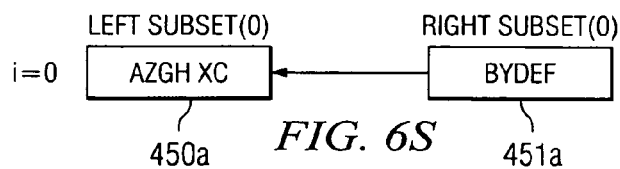
FIG. 6T

METHOD, DATA PROCESSING SYSTEM, AND COMPUTER PROGRAM PRODUCT FOR DETERMINING INVERSION EDGES FOR A CYCLIC COMPOUND DIRECTED GRAPH

BACKGROUND OF THE INVENTION

1. Technical Field

The present invention relates generally to an improved data processing system and in particular to a method and apparatus for determining edge directions in a directed graph. Still more particularly, the present invention provides a method and apparatus for identifying an edge to be inverted for minimizing upward directed edges in a cyclic compound directed graph.

2. Description of Related Art

A directed graph is a graph having nodes with one way edges interconnecting graph nodes. A directed graph may by cyclic or acyclic. An acyclic directed graph does not contain any cycles. That is, if there is a path, i.e., one or more edges, or arcs, from a first node to a second node, there is no combination of edges that provide a return path from the second node to the first node. A cyclic graph, on the other hand, contains at least one cycle.

A compound directed graph is a directed graph having one or more nodes referred to as subgraph, or compound, nodes that contain one or more nodes. Many uses of compound directed graphs exist. For example, compound directed graphs are often employed for business process modeling, graphic display of hierarchical systems, and the like. To facilitate readability of a compound directed graph, it is desirable for a compound directed graph to generally flow from top-to-bottom. That is, it is desirable to minimize the number of upward edges in a compound directed graph.

Various software applications for generating compound directed graphs exist. These software applications use algorithms that identify a feedback arc set, that is edges. Solution of a feedback arc set is nondeterministic polynomial (NP), and thus the computational complexity grows very fast relative to the input data size. However, conventional graphing algorithms are unable to effectively minimize the number of upward flowing edges when drawing a cyclic compound directed graph. Accordingly, compound directed graphs plotted by graphing applications often have numerous edges that flow against one another. Accordingly, the readability and general aesthetics of a compound directed graph are typically undesirable when a compound directed graph is plotted by conventional graphing applications. Additionally, existing graphing applications tend to minimize the vertical length of subgraphs at the expense of requiring additional upward edges.

It would be advantageous to provide a graphing application that determines vertical directions of edges for reducing the number of upward directed edges in a cyclic compound directed graph. It would be further advantageous to provide a graphing application that identifies one or more edges for inversion by a polynomial algorithm such that a near-optimum reduction in the number of upward directed edges in a compound directed graph is obtained.

SUMMARY OF THE INVENTION

The present invention provides a method, computer program product, and a data processing system for determining an edge for inversion in a cyclic compound directed graph. A plurality of graph nodes of a graph are evaluated for generation of a first node order subset pair. A determination that the graph requires a recursive evaluation for completing node ordering of the plurality of graph nodes is made. The graph is divided into a plurality of graph partitions, and respective node order subset pairs are generated for the graph partitions.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented in accordance with a preferred embodiment of the present invention;

FIG. 2 is a block diagram of a data processing system in which the present invention may be implemented in accordance with a preferred embodiment of the present invention;

FIG. 3 is a diagrammatic illustration of a table that defines the node connectivity of a directed graph in accordance with a preferred embodiment of the present invention;

FIGS. 6G–6I are diagrammatic illustrations of processing of the graph shown in FIG. 4 by the partitioning subroutine described with reference to FIG. 6D in accordance with a preferred embodiment of the present invention;

FIGS. 6J–6M are diagrammatic illustrations of a second iteration of the node ordering subroutine performed for evaluation of the node order of a graph partition in accordance with a preferred embodiment of the present invention;

FIGS. 6Q–6T are diagrammatic illustrations of generation of a node order set performed by the concatenation subroutine described with reference to FIG. 5E;

DETAILED DESCRIPTION OF THE PREFERRED EMBODIMENT

Figure 4:
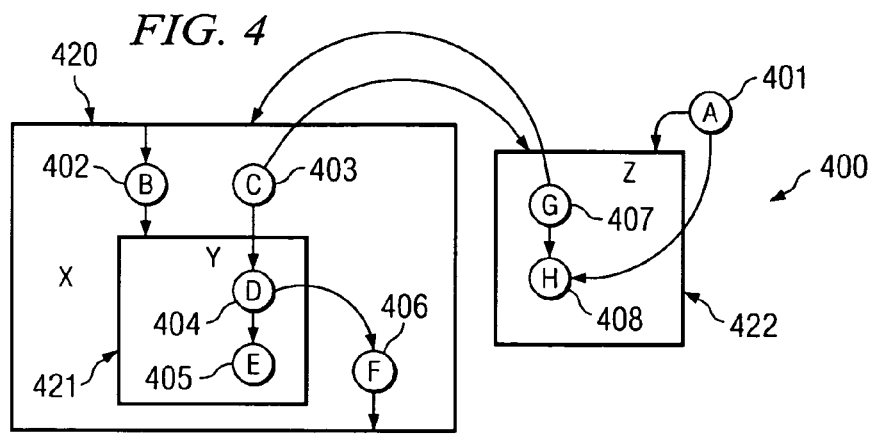
FIG. 4 is a diagrammatic illustration of a cyclic compound directed graph having node connectivity defined by the table shown in FIG. 3 that may be processed to determine edges for inversion in accordance with a preferred embodiment of the present invention.

The preferred embodiment of the present invention and its advantages are best understood by referring to FIGS. 1 through 9 of the drawings, like numerals being used for like and corresponding parts of the various drawings.

With reference now to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

FIG. 3 is a diagrammatic illustration of table 300 that defines the node connectivity of a cyclic compound directed graph in accordance with a preferred embodiment of the present invention. Table 300 is storable on a storage device, such as memory 224 of data processing system 200 in FIG. 2, or another computer-readable medium and the contents thereof are retrieved and processed by processor 202. Each record or row 301a–301k comprises data elements that identify a graph node. Data elements of respective fields 302a–302b in a common record make up an edge pair. In the illustrative example, data elements of field 302a comprise edge source nodes and data elements of field 302b comprise edge target nodes. Other fields, for example a key field, may be included in table 300 that facilitate indexing and data operations performed on particular records of table 300.

FIG. 4 is a diagrammatic illustration of a cyclic compound directed graph 400 having node connectivity defined by table 300 of FIG. 3 that may be processed to identify inversion edge(s) in accordance with a preferred embodiment of the present invention. The configuration of graph 400 is exemplary only and is chosen to facilitate and understanding of the invention. A graph having the connectivity defined in table 300 may be drawn with any number of configurations. The present invention provides a methodology for identifying one or more edges to invert such that the graph has a small number of upward directed edges by a heuristic solution of a node order of the graph.

Compound directed graph 400 comprises a plurality of nodes including nodes 401–408 respectively designated nodes A–H, and subgraph nodes 420–422 respectively designated subgraph nodes X–Z. The connectivity of nodes 401–408 and 420–422 is defined by table 300 described above with reference to FIG. 3. Subgraph node 420 contains nodes 402, 403 and 406 as well as subgraph node 421 which contains nodes 404 and 405. Subgraph node 422 contains nodes 407 and 408. Node 401 is not contained in any subgraph node.

A node contained within another node is said to be child node of the particular node containing the child node, and the node containing the child nodes is said to be a parent node of the child nodes. For example, nodes 402, 403, 406, and 421 are child nodes of subgraph node 420, which is the parent node of nodes 402, 403, 406, and 421.

Graph 400 contains directionally connected nodes and is referred to as a directed graph. An edge is a connection between two nodes (referred to as an edge pair). A directed edge is an edge with a direction associated with the edge. For example, a directed edge from node 403 (C) to node 404 (D) is indicated with the arrowhead connecting the nodes. A node is said to have an outgoing edge if an edge flows from the node to another node, and the node to which the directed edge flows is said to have an incoming edge. A directed edge is herein designated according to the following notation:

directed edge: (m,n), where m represents the node from which the directed edge originates, and n represents the node at which the directed edge terminates. Thus, the directed edge from node 403 to 404 may be designated as edge (C,D), and edge (C,D) is an outgoing edge for node 403 and an incoming edge for node 404. The node from which the directed edge originates is referred to as a source node, and the node at which the directed edge terminates is referred to as the target node. Thus, node 403 is the source node of edge (C,D) and node 404 is the target node of edge (C,D). As can be seen, each record 301a–301k of table 300 in FIG. 3 defines a directed edge, with the node identified in field 302a comprising the source node of an edge defined by a particular record, and the node identified in field 302b comprising the target node of the edge defined by the record.

As referred to herein, a node is referred to as a sink node if it has no outgoing edges and either its parent subgraph node is null, that is it is not included in a parent subgraph node, or its parent subgraph node is a sink node. For example, there are no outgoing edges from node 405, and the parent subgraph node 421 of node 405 is a sink node—that is subgraph node 420 has no outgoing edges and has no parent node. Thus, node 405 is classified as a sink node.

As referred to herein, a node is classified as a source node if it has no incoming edges and either its parent subgraph node is null, or its parent subgraph node is also a source. For example, node 401 has no incoming edges, and its parent subgraph node is null, that is node 401 is not contained in a subgraph node. Thus, node 401 is classified as a source node.

As referred to herein, a nested edge is an edge that has a subgraph node as a source node and a child node (or any level of child node of a node within the child node) of the subgraph node as a target node, or vice versa. For example, edges (X,B) and (F,X) are each examples of nested edges. As referred to herein, a loop is an edge that has a common node as a source node and target node of the edge. As referred to herein, a cycle is a closed path within a graph that is traversed along directed edges that originates and terminates at a common node without repetition of a node. No nodes are repeated in a cycle other than the node at which the cycle originates and terminates. As referred to herein, a compound cycle is a cycle that includes traversal of a compound, or subgraph, node. As referred to herein, a top-level subgraph node is a subgraph node that is not a child node of any other node. For example, subgraph nodes 420 and 422 are top-level subgraph nodes as neither subgraph node 420 or 422 is a child node of any other node within graph 400. Subgraph node 421 is not a top-level node as it is a child node of subgraph node 420.

As referred to herein, a removable sink node is a sink node (as defined above) that has no child nodes. That is, a sink node is a removable sink node if it is not a subgraph node, or it is a subgraph node containing no child nodes. Notably, a graphing application of the present invention orders nodes into subsets while "removing," or otherwise designating, a node included in a node order subset from the graph. As such, a node may at one point during processing by the graphing application be evaluated as non-removable, while the same node may later be identified during processing of the graph as removable. As referred to herein, a removable source node is a source node (as defined above) that has no child nodes. As referred to herein, an inverted edge is an edge that has a vertical displacement in opposition to the vertical displacement of the majority of edges in a graph. The present invention provides a computer-implemented methodology for reducing the number of inverted edges in a cyclic compound directed graph.

Compound directed graph 400 is transformed to provide a general top-down flow between nodes in accordance with a preferred embodiment of the present invention. In general, a graphing application implemented as a computer-readable set of logic instructions analyzes an input graph and transforms the graph such that the graph contains the minimum number of inverted edges. The graphing application operates on a data structure, such as table 300 described with reference to FIG. 3, that defines a directed graph, such as directed graph 400 described with reference to FIG. 4.

Figure 5A:
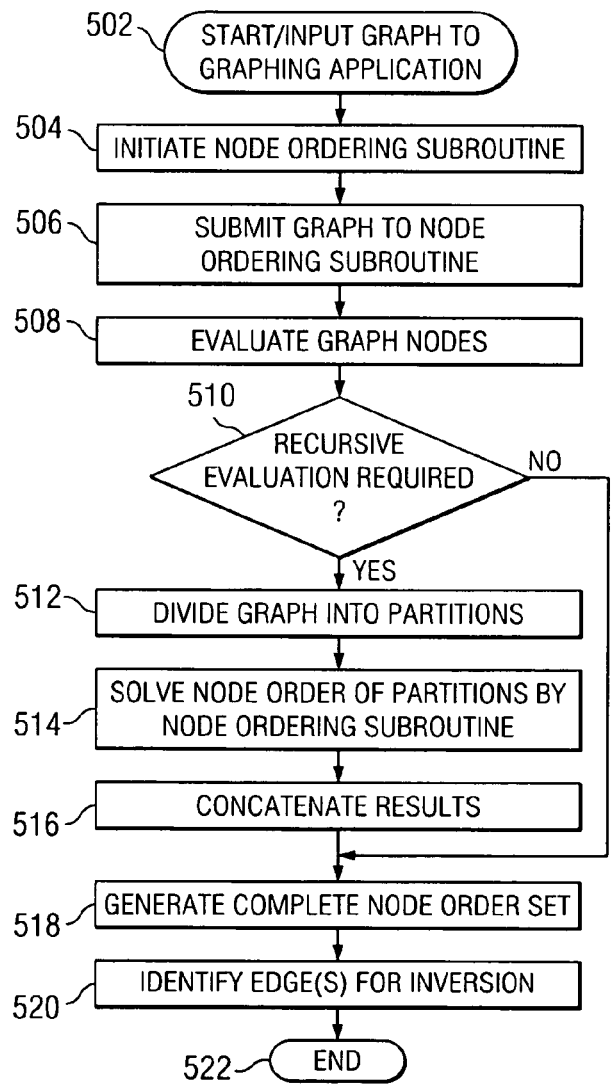
FIG. 5A is a flowchart of processing performed by a graphing application for determining an edge for inversion of a cyclic compound directed graph in accordance with a preferred embodiment of the present invention.

FIG. 5A is a flowchart of processing performed by a graphing application for determining nominal vertical displacement of edges of a cyclic compound directed graph, such as graph 400 shown in FIG. 4, in accordance with a preferred embodiment of the present invention. The graphing application is initiated (step 502) by supplying a graph data structure as input to the graphing application. A node ordering subroutine of the graphing application is then invoked (step 504) and the Input graph is submitted to the node ordering subroutine (step 506). The node ordering subroutine then evaluates the graph elements as described more fully below with reference to FIG. 53. An evaluation of the graph is made to determine if a recursive evaluation is required to identify any graph edges fir inversion (step 510). In accordance wit a preferred embodiment of the invention, the evaluation of step 510 is performed by a graph evaluation subroutine described more fully below with reference to FIG. 5C. If a recursive evaluation of the graph is not required, the graphing application generates a complete node order set from the results of the graph node evaluation of step 508 (step 518). If a recursive evaluation of the graph is required, the graph is divided into partitions (step 512). Division of the graph into graph partitions may be performed by a partitioning subroutine described more fully below with reference to FIG. 5D. The node order of each graph partition is then solved by the node ordering subroutine (step 514). The node order results of the graph partitions are then concatenated (step 516). Concatenation of partition node order results may be performed by a concatenation subroutine described more fully below with reference to FIG. 5E. A complete node order set defining a node order of the graph input to the graphing application at step 502 is then generated (step 518) and one or more edges that may be inverted to minimize the number of inverted graph edges are identified (step 520). The graphing application then exits (step 522).

Figure 5B:
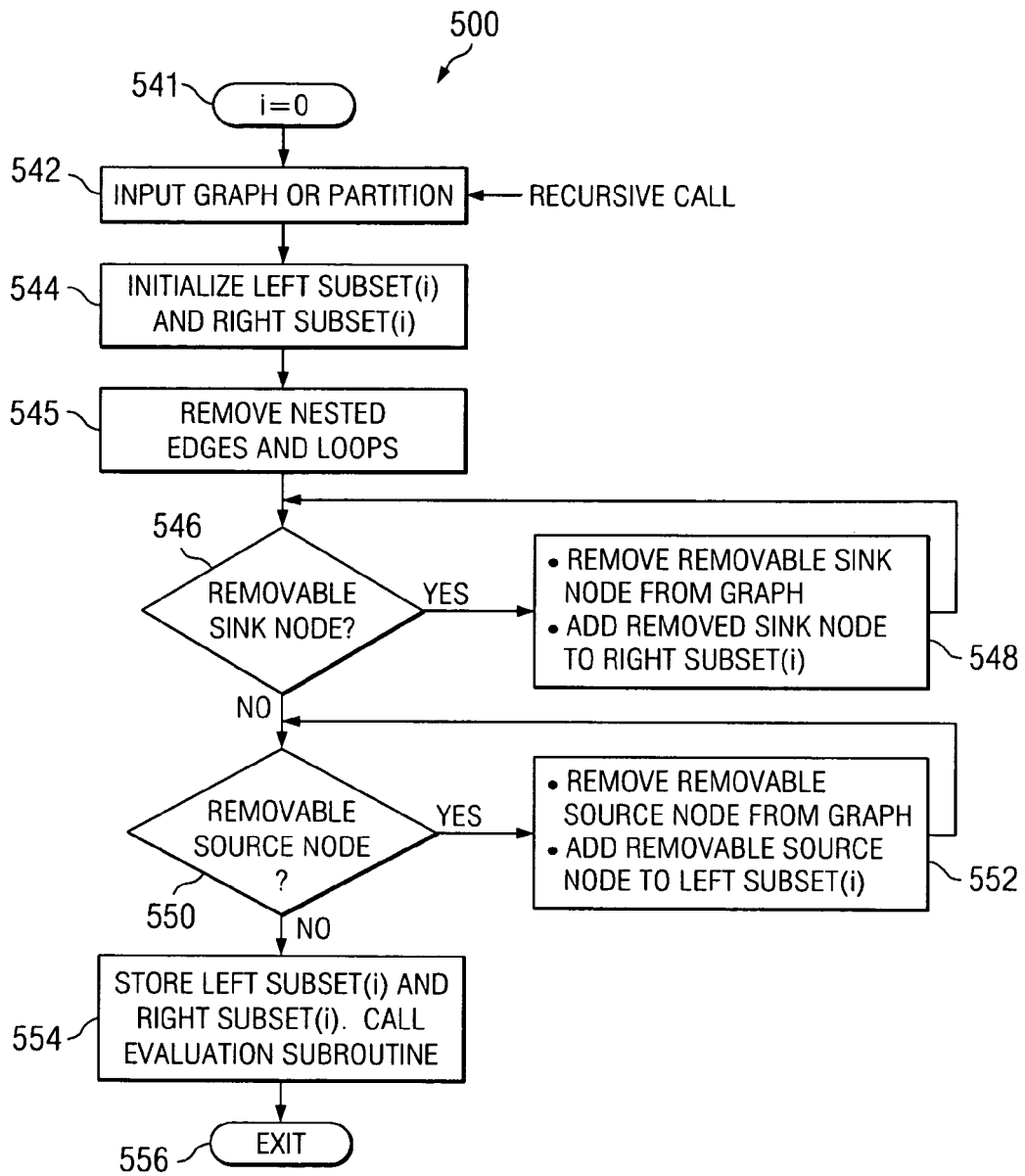
FIG. 5B is a flowchart of processing performed by a node ordering subroutine of the graphing application described in FIG. 5A in accordance with a preferred embodiment of the present invention.

With reference now to FIG. 5B, a flowchart of processing performed by the node ordering subroutine of the graphing application described in FIG. 5A is shown in accordance with a preferred embodiment of the present invention. An iteration counter variable i is initialized (step 541) and the graph, or a graph partition, is supplied to the node ordering subroutine (step 542). Two node order subsets (Left subset(i) and Right subset (i)) are initialized for recording the node order of node subsets of the graph supplied to the node ordering subroutine (step 544). Node order subsets associated with a common iteration value (i) are referred to herein as a subset pair. Left subset(i) and Right subset(i) may be implemented as, for example, data arrays for recording the node order of the input graph. As a node designation is added to a node order subset, the sequence in which the nodes are added to the node order subset is maintained. For illustrative purposes, nodes ordered in a Left or Right subset are sequentially ordered from left to right. Nested edges and loops are then identified and removed from the graph (step 545).

The graph is next analyzed for inclusion of any removable sink nodes (step 546). In the event that a removable sink node is identified, it is removed from the graph and recorded in Right subset(i) (step 548). Any edges that terminate at the removed sink node are also removed from the graph when the removable sink node is removed. The node ordering subroutine continues to loop through the identification and removal steps 546 and 548 until the evaluation at step 546 results in identification of no removable sink nodes.

When no removable sink nodes remain, the node ordering subroutine proceeds to evaluate the graph for inclusion of any removable source nodes (step 550). In the event that a removable source node is identified, it is removed from the graph and added to Left subset(i) (step 552). Any edges that originate at the removed source node are also removed from the graph when the removable source node is removed and recorded in the Left subset(i). The node ordering subroutine continues to loop through the identification and removal steps 550 and 552 until the evaluation at step 550 results in identification of no removable source nodes. The Left subset (i) and the Right subset(i) are then temporarily stored, for example in main memory 204 of FIG. 2, and the node ordering subroutine exits (step 556).

Figure 5C:
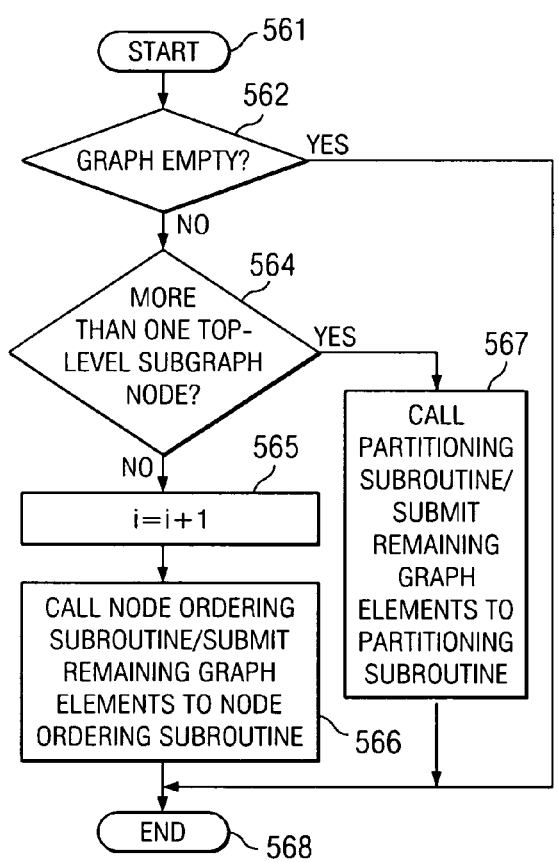
FIG. 5C is a flowchart of processing performed by an evaluation subroutine for determining whether a graph requires a recursive solution in accordance with a preferred embodiment of the present invention.

The evaluation subroutine is invoked when generation of the Left subset(i) and the Right subset(i) is completed. FIG. 5C shows processing performed by the evaluation subroutine for determining whether the graph requires a recursive solution to complete ordering of the graph nodes in accordance with a preferred embodiment of the present invention. The evaluation subroutine is initiated (step 561) and determines if any graph elements remain (step 562). That is, an evaluation is made to determine if all graph elements have been ordered in the Left subset(i) and the Right subset(i). An evaluation that the graph is empty results the evaluation subroutine exiting (step 568).

If, however, the graph evaluation at step 562 results in identification of remaining graph elements, a subsequent evaluation is made to determine if more than one top-level subgraph node is included in the remaining graph elements (step 564). The iteration counter variable i is incremented if only a single top-level subgraph node is identified in the remaining graph elements (step 565), and the remaining graph elements are submitted as a single graph partition to the node ordering subroutine (step 566). That is, the node ordering subroutine is called and the remaining graph elements are evaluated by returning processing to step 542 of the flowchart shown in FIG. 5B. The evaluation subroutine then exits (step 568).

If more than one top-level subgraph node is identified at step 564 thus indicating the graph is a cyclic compound graph, the evaluation subroutine calls a partitioning subroutine and submits the remaining graph elements to the partitioning subroutine (step 567). The evaluation subroutine then exits (step 568).

Figure 5D:
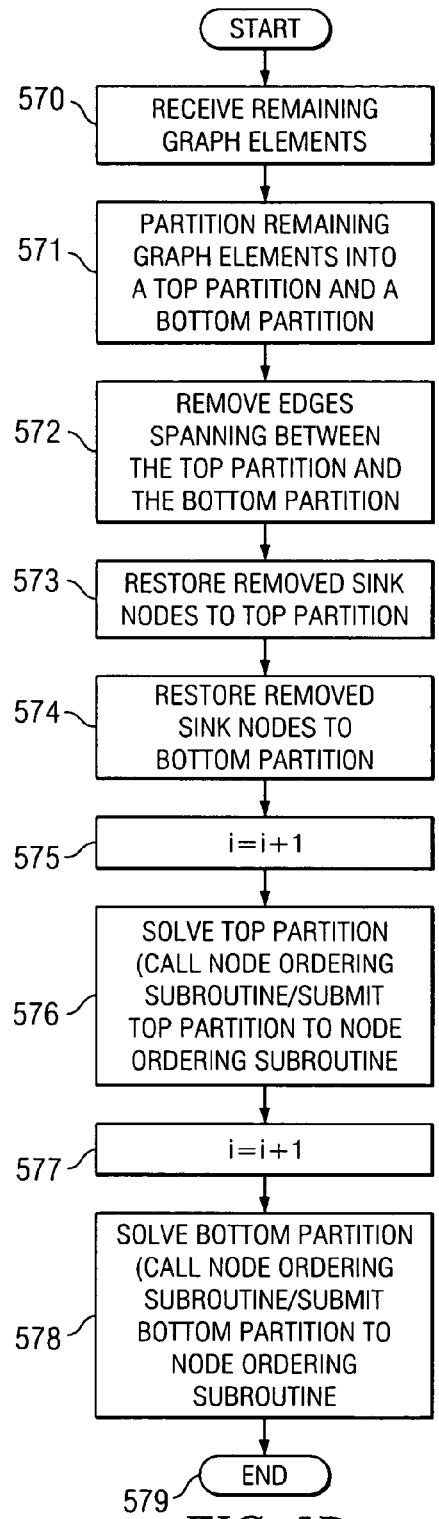
FIG. 5D is a flowchart of processing performed by a partitioning subroutine for dividing graph elements of a compound cyclic graph into partitions in accordance with a preferred embodiment of the present invention.

FIG. 5D is a flowchart depicting processing of the partitioning subroutine for dividing remaining elements of a compound cyclic graph into partitions in accordance with a preferred embodiment of the present invention. The partitioning subroutine receives the remaining graph elements (step 570). The graph elements are divided into two partitions designated as a Top partition and a Bottom partition (step 571). Each of the partitions includes at least one top-level subgraph node. Various techniques may be used for allocating the remaining top-level subgraph nodes between the Top partition and the Bottom partition.

In one embodiment, a greedy heuristic algorithm is used to choose the top-level subgraph node to be assigned to the Top partition. Preferably, the top-level subgraph node that provides the greatest difference between the recursive sum of the outgoing edges and the recursive sum of the incoming edges is selected for the Top partition. The recursive sum of outgoing edges is the sum of all outgoing edges from all nodes of the particular top-level subgraph node, and the recursive sum of the incoming edges if the sum of all incoming edges from all nodes in the top-level subgraph node.

Next the partitioning subroutine removes all edges from the remaining graph elements submitted to the graph partition subroutine that span the Top partition and the Bottom partition (step 572). Nodes previously identified as removable sink nodes by the node ordering subroutine described above with reference to FIG. 5B are then restored to the subgraph nodes in the Top partition (step 573). When a node is restored to a subgraph node of the Top partition, any edge (excluding nested edges or loops) connecting it with another node existing in the Top partition is also restored as well.

The partitioning subroutine then restores any nodes previously identified as removable source nodes by the node ordering subroutine described above with reference to FIG. 5B (step 574). As in the restoration of nodes to the Top partition, any edges between a restored node and an existing node, excluding nested edges and loops, are restored as well. The iteration counter variable i is then incremented (step 575). The partitioning subroutine then calls the node ordering subroutine and supplies the Top partition to the node ordering subroutine for solution of node order subsets of the Top partition (step 576). The node ordering subroutine is invoked and begins processing the node order of the Top partition at step 542 of FIG. 5B. Processing of the partitioning subroutine may be temporarily suspended until the node order of the Top partition is solved at which time the partitioning subroutine again increments the iteration counter variable i (step 577). The partitioning subroutine again calls the node ordering subroutine and submits the Bottom partition to the node ordering subroutine for solution of node order subsets of the Bottom partition (step 578). The partitioning subroutine then exits (step 579). The partitioning subroutine may be recursively called by the evaluation subroutine during evaluation of any remaining graph elements identified after an iteration of the node ordering subroutine during processing of the Top or Bottom partition.

Figure 5E:
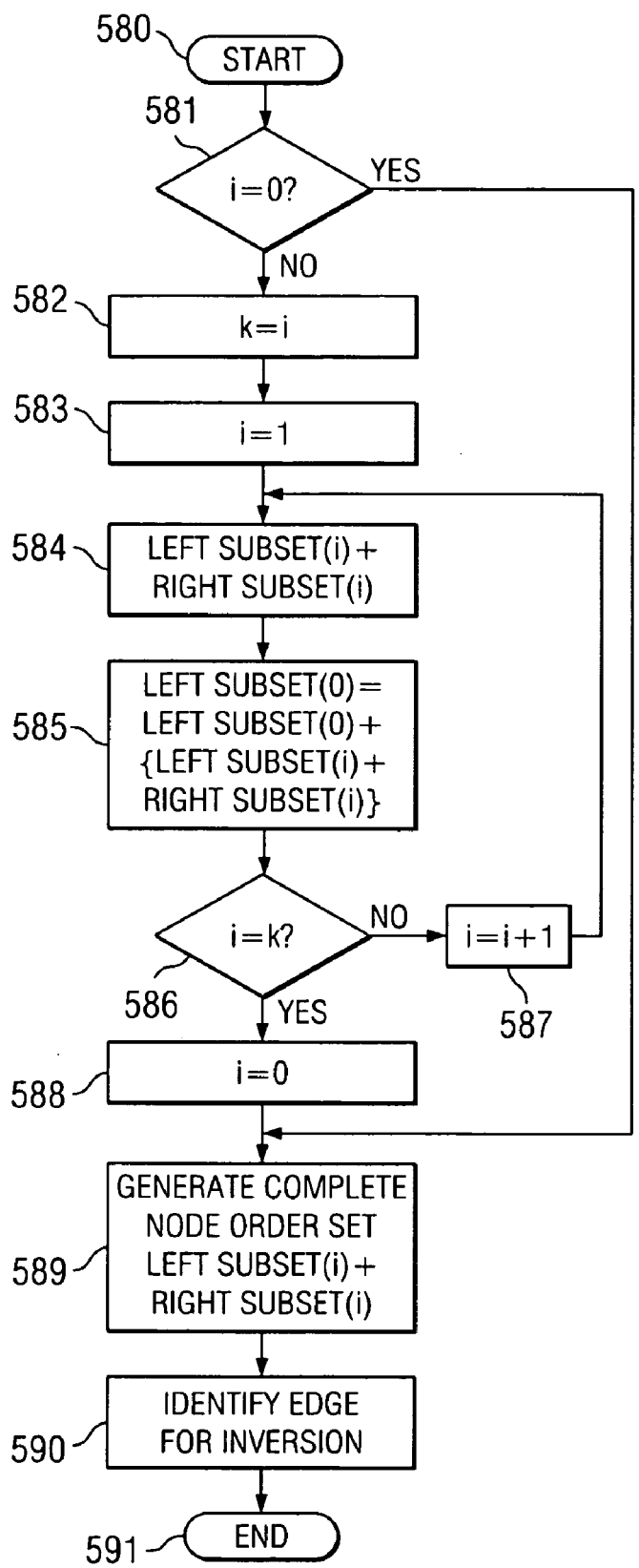
FIG. 5E is a flowchart of processing performed by a concatenation subroutine for generating a complete node order set in accordance with a preferred embodiment of the present invention.

When all node order subsets are completed and no graph elements remain to be ordered, a concatenation subroutine is invoked for generation of a complete node order set. FIG. 5E is a flowchart of processing performed by the concatenation subroutine for generating a complete node order set in accordance with a preferred embodiment of the present invention. The concatenation subroutine is initiated (step 580) and evaluates whether only a single node order subset pair was required to order all graph nodes by evaluating the iteration counter variable i. If only a single iteration was required to order all graph nodes, that is if the iteration counter variable i is equal to zero, the concatenation subroutine proceeds to step 589 and concatenates the Left subset(i) with the Right subset(i).

If, however, the concatenation subroutine processing determines that more than one iteration was required for ordering all nodes of the graph, that is if the iteration counter variable is evaluated as a value other than zero at step 581, the concatenation subroutine proceeds to set a variable k to the iteration counter variable i (step 582). Thus, the variable k stores the number of iterations that were required to process the node ordering of the graph when more than one iteration was performed. The iteration counter variable i is then set to 1 (step 583), and the Left subset(i) and the Right subset(i) are concatenated (step 584). Next, the concatenation of the Left subset(i) and the Right subset(i) is appended with the Left subset(0) (step 585), and the iteration counter variable i is compared with the variable k (step 586). If the iteration counter variable i and the variable k are not equal, the concatenation subroutine proceeds to increment the iteration counter variable i (step 587) and processing returns to step 593 for concatenation of the next node order subset pair. Reiteration of steps 584–587 results in concatenation of corresponding node order subset pair and appendage of concatenated node order subsets to Left subset(0).

When the iteration counter variable i and the variable k are determined to be equal at step 586, the concatenation subroutine proceeds to set the iteration counter variable to 0 (step 588). The left subset(0) and the right subset(0) are then concatenated thus completing generation of the node order set (step 589). Inversion edges are then identified by the node order set (step 590). The concatenation subroutine then exits (step 591). The graph may then be plotted in accordance with the identified inversion edges. The present invention may better be understood with an exemplary graph node ordering analysis shown by diagrammatic illustrations of FIGS. 6A–6T performed in accordance with a preferred embodiment of the present invention. The exemplary graph processing shown is illustrative of node order processing performed on a graph 400 of FIG. 4 having the node connectivity defined by table 300 in FIG. 3. The graphing application is invoked and the node ordering subroutine described above with reference to FIG. 5B begins by initializing the iteration counter variable i to zero in accordance with step 541 of FIG. 5B. Table 300 that defines the node connectivity of the initial graph 400 shown in FIG. 4 is input to the node ordering subroutine in accordance with step 542 of FIG. 5B. Left subset(0) 450a and right subset(0) 451a are initialized as shown by the diagrammatic illustration of graph 400 in FIG. 6A. Left subset 450a and Right subset 451a are initially nulled.

Figure 6A:
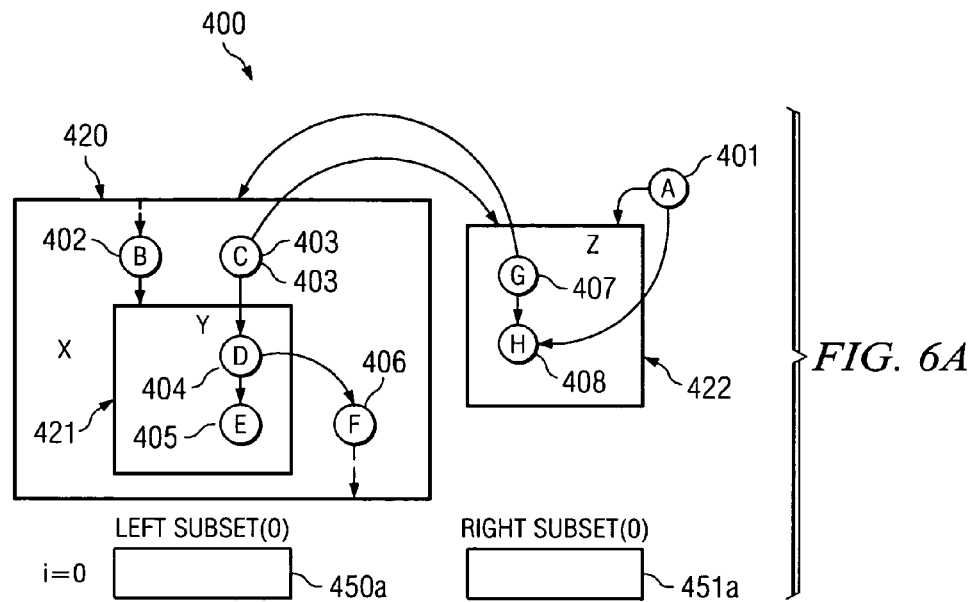
FIGS. 6A–6F are diagrammatic illustrations of the graph shown in FIG. 4 processed by a first iteration of the node ordering subroutine described with reference to FIG. 5B in accordance with a preferred embodiment of the present invention.
Figure 6B:
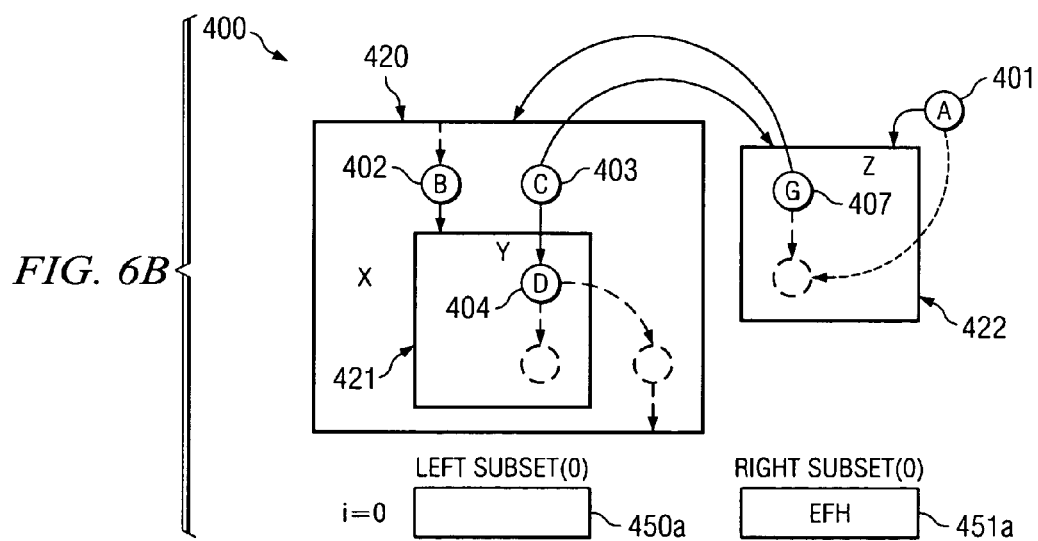

Next, the node ordering subroutine identifies nested edges and loops in the source graph for removal in accordance with step 545 of FIG. 5B. In the illustrative example, graph 400 contains two nested edges and no loops. Particularly, graph 400 contains a nested edge (X,B) from subgraph node 420 to node 402 and a nested edge (F,X) from node 406 to subgraph node 420. The identified nested edges are removed from graph 400 as shown in FIG. 6A. In the illustrative examples, removal of graph edges or nodes is designated by a dashed line corresponding to the removed graph element.

The algorithm next proceeds to identify and remove any removable sink nodes from graph 400 in accordance with steps 546 and 548 of FIG. 5B. In the illustrative example, graph 400 includes removable sink nodes 405, 406 and 408. Removable sink nodes 405, 406 and 408 are removed from graph 400 and are recorded in Right subset(0) 451a as shown by the diagrammatic illustration of graph 400 in FIG. 6B. Additionally, any edges originating or terminating at a removed sink node are removed as well.

Figure 6C:
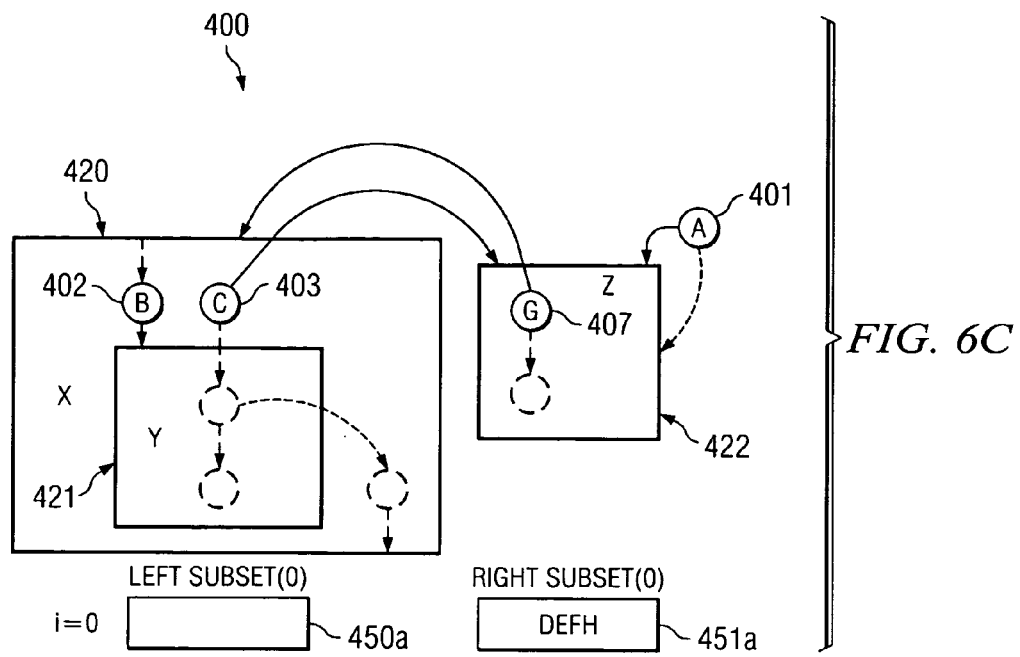

After identification and removal of the removable sink nodes and the associated edges, the algorithm again evaluates graph 400 for inclusion of any removable sink nodes. Node 404 has no outgoing edges after removal of the previously identified removable sink nodes and associated edges and is now identified as a removable sink node. The algorithm removes removable sink node 404 and appends the designation of removable sink node 404 to Right subset (0) 451a as shown in FIG. 6C.

Figure 6D:
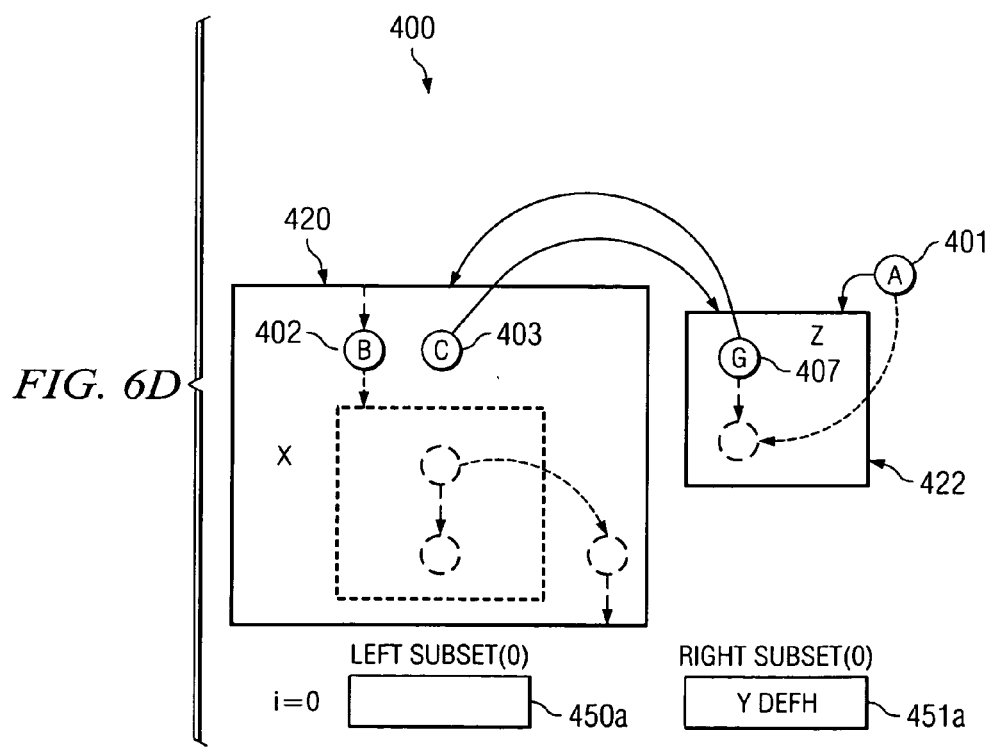
Figure 6E:
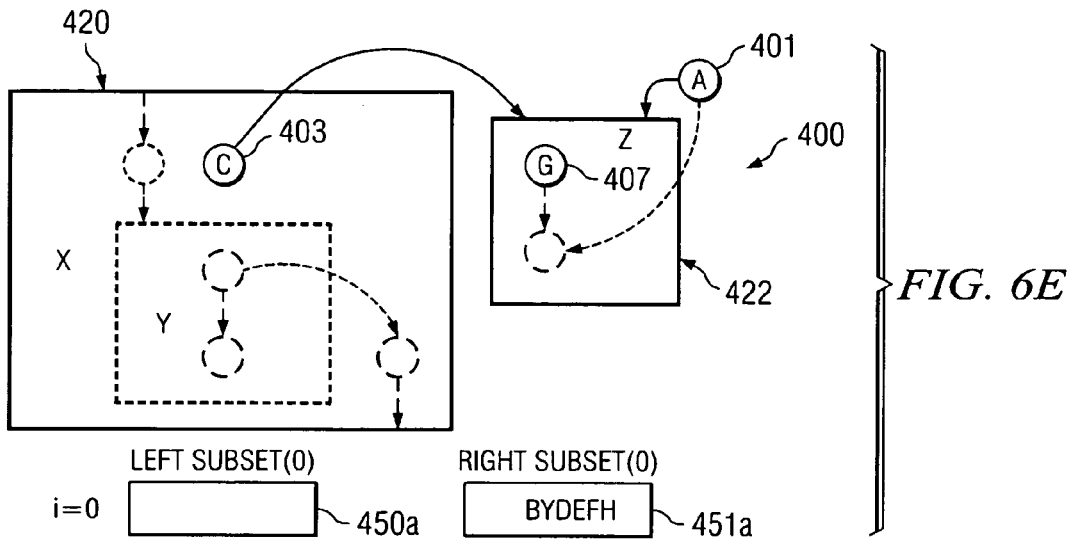

The node ordering algorithm again evaluates graph 400 for inclusion of any removable sink nodes. After removal of node 404, subgraph node 421 having parent subgraph node 420 has no outgoing edges and contains no nodes, that is subgraph node 421 is a removable sink node. Accordingly, subgraph node 421 is removed from graph 400 and is recorded in Right subset(0) 451a as shown by FIG. 6D. Another evaluation of graph 400 results in identification of node 402 as a removable sink node. Hence, node 402 is removed and is recorded in Right subset(0) 451a as shown in FIG. 6E. A subsequent evaluation of graph 400 results in identification of no additional sink nodes.

When all removable sink nodes have been identified and removed from graph 400 as shown in FIG. 6E, an evaluation of the remaining graph elements is made to identify any removable source nodes in accordance with steps 550 and 552 of FIG. 5B. In the illustrative example, node 401 is identified as a removable source node and is removed as shown by the diagrammatic illustration of graph 400. Removed source node 401 is recorded in Left subset(0) 450a as shown in FIG. 6F.

In the illustrative example, only the first iteration of step 550 results in identification and removal of a removable source node. Right subset(0) 450a and Left subset(0) 451a are temporarily stored in accordance with step 554 of FIG. 5B and a call is made to the evaluation subroutine. The node ordering subroutine then exits in accordance with step 556 of FIG. 5B.

The evaluation subroutine described above with reference to FIG. 5C is then invoked to evaluate the graph to determine if a recursive solution of the graph node ordering is required. The evaluation performed by the recursive evaluation subroutine is performed on the graph state when node ordering of Left subset(0) 450*a* and Right subset(O) 451*a* is complete, that is on the state of graph 400 shown in FIG. 6F. The graph is evaluated to determine if any graph elements remain in accordance with step 562 of FIG. 5C. In the illustrative example, nodes 403, 407, 420 and 422 remain in the graph. Hence, the graph is then evaluated to determine if more than one top-level subgraph node is included in the remaining graph elements in accordance with step 564 of FIG. 5C. Nodes 420 and 422 are each top-level subgraph nodes. Thus, the evaluation subroutine proceeds to call the partitioning subroutine in accordance with step 567 of FIG. 5C.

Figure 6F:
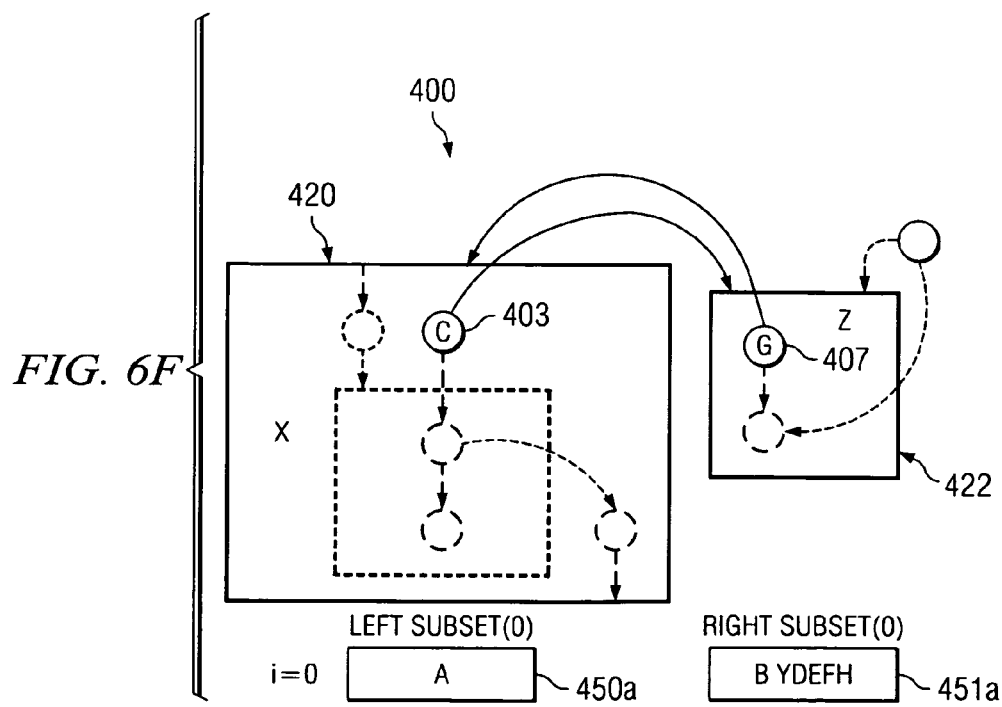
Figures 6G, 6H:
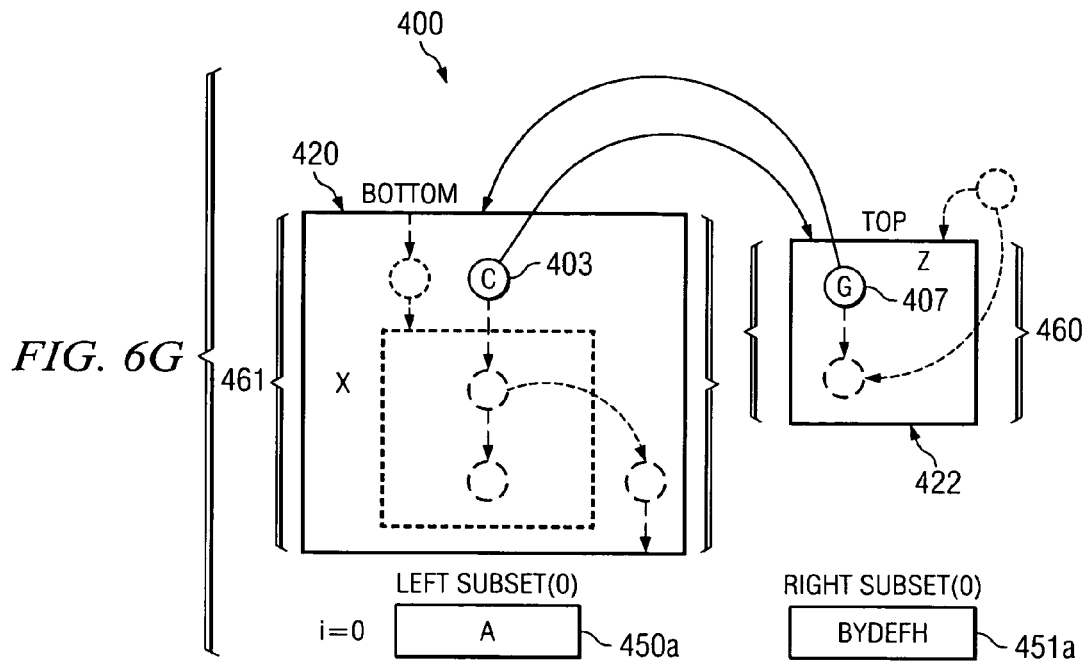

The remaining graph shown in FIG. 6F is submitted for processing by the partitioning subroutine in accordance with step 570 of FIG. 5D. The partitioning subroutine divides the remaining graph elements into a Top partition and a Bottom partition in accordance with step 571 of FIG. 5D. The remaining graph elements are divided such that each of the Top partition and the Bottom partition include at least one top-level node. In the illustrative example, the differential between outgoing and incoming edges for the subgraph nodes 420 and 422 are equivalent, and either subgraph node 420 or 422 may be assigned to the Top partition. In the present example, top-level subgraph node 422 is assigned to Top partition 460 and top-level subgraph node 420 is assigned to Bottom partition 461 as shown by the diagrammatic illustration of graph 400 in FIG. 6G.

Next, all edges spanning from any node in Top partition 460 to a node in Bottom partition 461 are removed in accordance with step 572 of FIG. 5D. In the illustrative example, an edge (G,X) from node 407 to subgraph node 420 spans Top partition 460 and Bottom partition 420, and an edge (C,Z) from node 403 to subgraph node 422 spans Bottom partition 461 and Top partition 460. Accordingly, edges (G,X) and (C,Z) are removed as shown by the diagrammatic illustration of graph partitions 460 and 461 in FIG. 6H.

The partitioning subroutine then proceeds to restore any previously removed sink nodes that were originally nested within any subgraph node of Top partition 460 in accordance with step 573 in FIG. 5B. In the illustrative example, node 408 was previously identified as a removable sink node and was recorded in Right subset(0) 451*a*. Accordingly, node 408 is restored to subgraph node 422 in top graph partition 460 and the node designation "H" corresponding to restored node 408 is removed from right subset( ) 451*a* as shown in FIG. 6I. Restoration of a node includes restoration any edges connecting the restored node to a node that is present at the time that the node is restored. Accordingly, edge (G,H) is restored with restoration of node 408.

The partitioning subroutine proceeds to restore any removed source nodes that were originally nested within a subgraph node assigned to Bottom partition 461 in accordance with step 574 of FIG. 5D. In the illustrative example, no source nodes were previously removed from elements of graph 400 now assigned to Bottom partition 461.

The partitioning subroutine then increments the iteration counter variable i in accordance with step 575 of FIG. 5D and calls the node ordering subroutine for node ordering of Top partition 460 (step 576). The Top partition 460 is submitted to the node ordering subroutine. Processing of Top partition 460 by the node ordering subroutine commences at step 542 of FIG. 5B as described more fully below.

The partitioning subroutine then increments the iteration counter variable i in accordance with step 577 of FIG. 5D and again calls the node ordering subroutine for node ordering of Bottom partition 461 in accordance with step 578 of FIG. 5D. Bottom partition 461 is submitted to the node ordering subroutine. Processing of Bottom partition 461 by the node ordering subroutine commences at step 542 of FIG. 5B as described more fully below. The partitioning subroutine then exits in accordance with step 579 of FIG. 5D.

Figure 6L:
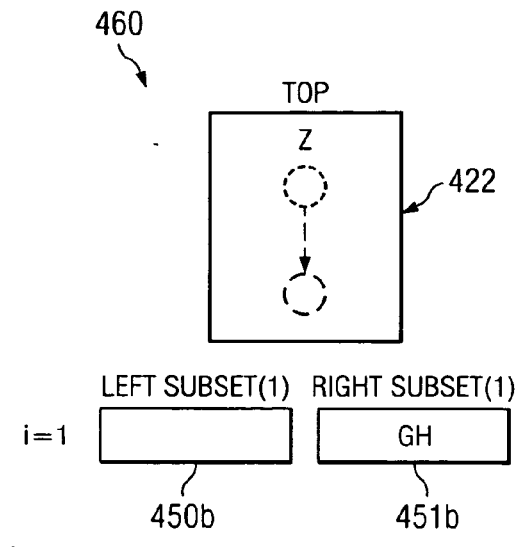
Figure 6M:
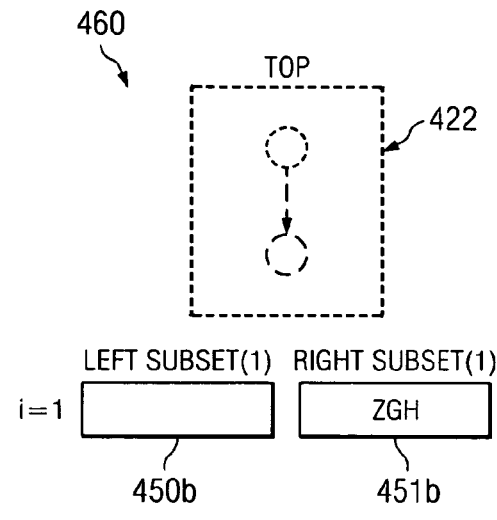

Node order subsets of Top partition 460 are then generated in accordance with the processing steps 542–554 of FIG. 5B in accordance with a preferred embodiment of the present invention. In the illustrative example, Top partition 460 includes subgraph node 422 having child nodes 407 and 408. The node ordering subroutine, responsive to receipt of Top partition 460, initializes Left subset(1) 450*b* and Right subset(1) 451*b* in accordance with step 544 of FIG. 5B and as shown by the diagrammatic illustration of Top partition 460 in FIG. 6J. No nested edges or loops in Top partition 460 are identified by the node ordering subroutine at step 545, thus the node ordering subroutine proceeds to identify and remove any removable sink nodes in Top partition 460 in accordance with steps 546 and 548 of FIG. 5B. In the illustrative example, node 408 is identified as a removable sink node. Node 408 is accordingly removed from Top partition 460 and is recorded in right subset(1) 451*b* as shown in FIG. 6K. Removal of edge (G,H) is performed with removal of node 408. The node ordering subroutine again attempts identification of a removable sink node in Top partition 460, and node 407 is identified as a removable sink node. Node 407 is then removed from Top partition 460 and is recorded in Right subset(1) 451*b* as shown in FIG. 6L. After removal of node 407, no child nodes remain in subgraph node 422. Hence, subgraph node 422 is identified as a removable sink node and is removed from Top partition 460. Subgraph node 422 is then recorded in Right subset 451*b* as shown in FIG. 6M.

Another iteration of step 546 results in identification of no removable sink nodes. Accordingly, the node ordering subroutine proceeds to evaluate Top partition 460 for inclusion of any removable source nodes in accordance with step 550 of FIG. 5B. No graph elements remain in Top partition. Hence, Left subset(1) 450*b* and Right subset(1) 451*b* are temporarily stored and a call to the evaluation subroutine described with reference to FIG. 5C is made in accordance with step 554 of FIG. 5B. Processing of Top partition 460 by the node ordering subroutine then ends in accordance with step 556 of FIG. 5B.

The Top partition is then submitted to the evaluation subroutine to determine whether additional recursive analysis is required to determine the node order of Top partition 460. The evaluation subroutine is invoked in accordance with step 561 of FIG. 5C. Top partition 460 is evaluated for inclusion of any remaining graph elements. As shown in FIG. 6M, no additional graph elements remain in Top partition 460. Accordingly, the evaluation subroutine exits in accordance with step 568 of FIG. 5C.

Figure 6N:
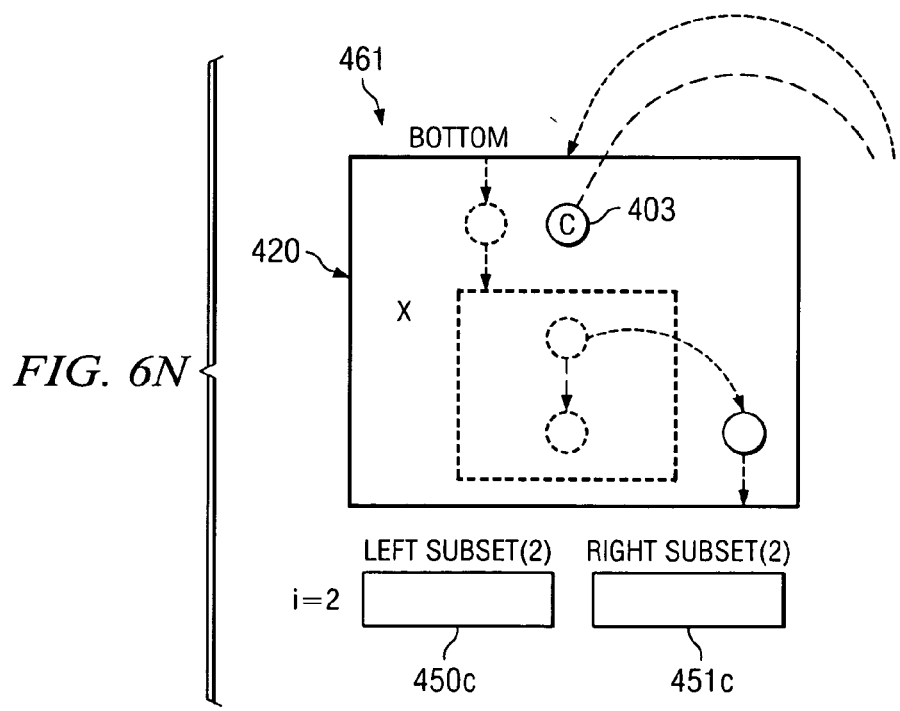
FIGS. 6N–6P are diagrammatic illustrations of a third iteration of the node ordering subroutine performed for evaluation of the node order of a graph partition in accordance with a preferred embodiment of the present invention.
Figure 6O:
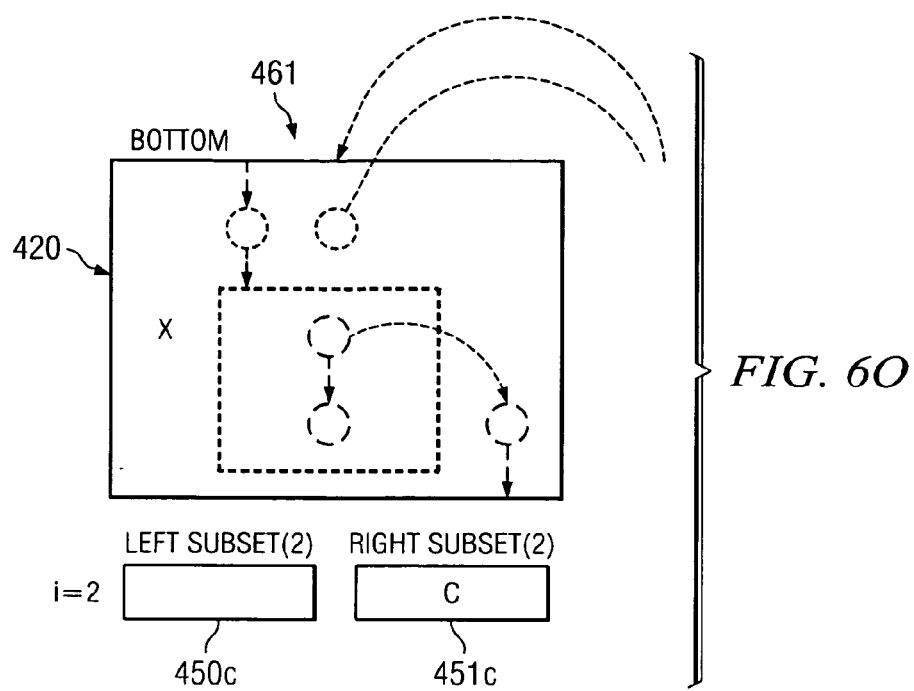

The node ordering of Bottom partition 461 is performed in a similar manner as that described above for the node ordering of Top partition 460. Particularly, the node ordering subroutine is invoked and Bottom partition 461 is submitted for analysis in accordance with step 542 of FIG. 5B. Left subset(2) 450c and Right subset(2) 451c are initialized for recording the node order of Bottom partition 461 in accordance with step 544 of FIG. 5B and as shown in FIG. 6N. The node order subset processing subroutine proceeds to evaluate Bottom partition 461 for inclusion of any removable sink nodes in accordance with steps 546 and 548 of FIG. 5B. On a first iteration of step 546, node 403 is identified as a removable sink node. Accordingly, node 403 is removed from Bottom partition 461 and is recorded in right subset(2) 451c as shown in FIG. 6O. After removal of node 403, a subsequent iteration of step 546 results in identification of subgraph node 420 as a removable sink node. Accordingly, subgraph node 420 is removed from Bottom partition 461 and is recorded in Right subset(2) 451c as shown in the diagrammatic illustration of graph 400 in FIG. 6P.

No graph elements remain in bottom graph partition 461. Accordingly, a subsequent iteration of step 546 results in failure to identify any additional removable sink nodes and the node ordering subroutine proceeds to step 550 upon which no removable source nodes are identified. Left subset (2) 450c and Right subset(2) 451c are then temporarily stored and the node ordering subroutine calls the evaluation subroutine in accordance with step 554 of FIG. 5B. The node ordering subroutine then exits.

Figure 6P:
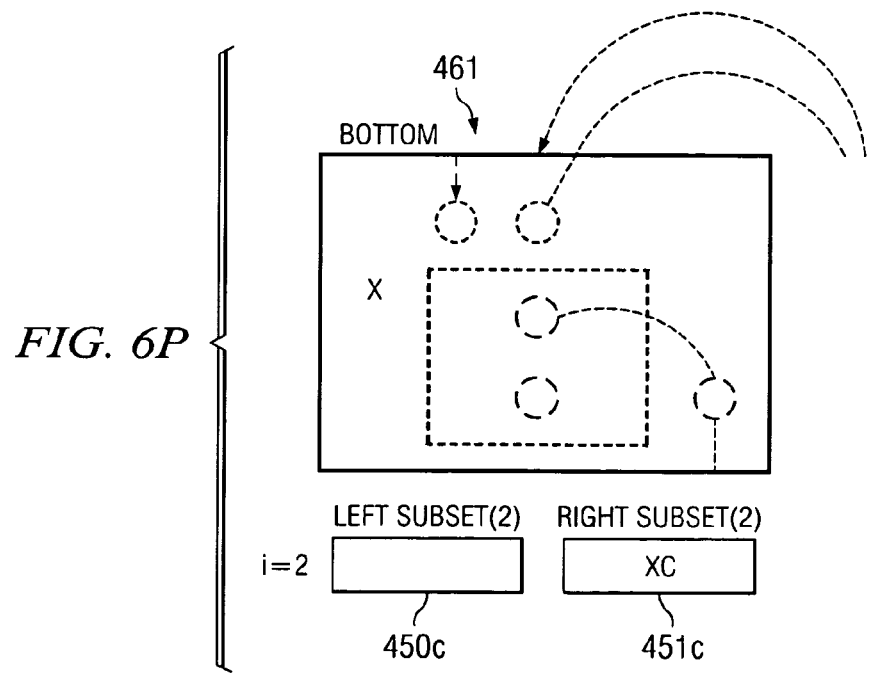
Figure 7:
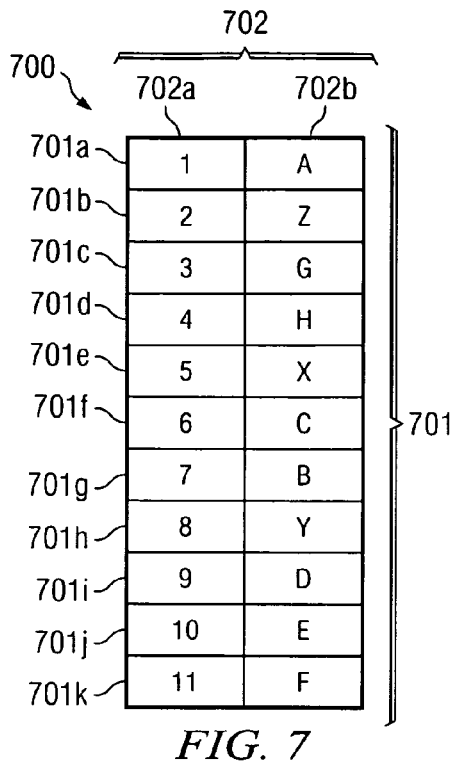
FIG. 7 is a diagrammatic illustration of a table for associating each node of a node order set with a sequence number that facilitates identification of an edge for inversion in accordance with a preferred embodiment of the present invention.

The evaluation subroutine then evaluates Bottom partition 461 to determine if additional recursive analysis is required to complete the node ordering of Bottom partition 461. The evaluation subroutine is invoked in accordance with step 561 of FIG. 5C. Bottom partition 461 is evaluated for inclusion of any remaining graph elements in accordance with step 562 of FIG. 5C. As shown in FIG. 6P, no additional graph elements remain in Bottom partition 461. Accordingly, the evaluation subroutine exits.

The concatenation subroutine is invoked upon placement of all graph nodes within a Left or Right subset. The iteration counter variable i is evaluated in accordance with step 581 of FIG. 5E and the concatenation subroutine proceeds to set a variable k equal to the iteration counter variable in accordance with step 582 of FIG. 5E. The iteration counter variable is then reset to a value of 1 in accordance with step 583. Left subset(1) 450b and Right subset(1) 451b are then concatenated in accordance with step 584 of FIG. 5E and as shown in FIG. 6Q. Node order set(1) 455b of Top partition 460 results from the concatenation of Left subset(1) and Right subset(1). Node order set(1) 455b is then appended to Left subset(0) in accordance with step 585 of FIG. 5E and as shown in FIG. 6R.

The concatenation subroutine then compares the iteration counter variable i with variable k in accordance with step 586 of FIG. 5E. The iteration counter variable i and variable k are not equal, and thus the counter variable is incremented in accordance with step 587 of FIG. 5E. Left subset(2) and Right subset(2) are then concatenated in accordance with step 584 of FIG. 5E. Node order set(2) 455c of Bottom partition 461 is generated from the concatenation of Left subset(2) and Right subset(2) as shown in FIG. 6R. Node order set 455c is then appended to Left subset(0) in accordance with step 585 of FIG. 5E and as shown in FIG. 6S.

The iteration counter variable i is again compared with the variable k. Both the iteration counter variable i and the variable k are now equal to 2. Thus, the concatenation subroutine proceeds to set the iteration counter variable to 0 in accordance with step 588 of FIG. 5E. Node order set 455a of graph 400 is then generated by concatenating Left subset (0) and Right subset(0) in accordance with step 589 of FIG. 5E and as shown in FIG. 6T.

Next, the graphing application identifies one or more graph edges for inversion in accordance with step 590 of FIG. 5E. To this end, each node in node order set 455a is assigned a sequence number. For example, node order set 455a may be inserted into records 701a–701k of table 700 shown in FIG. 7 for identifying graph edges for inversion in accordance with a preferred embodiment of the present invention. Table 700 includes records 701a–701k that store a respective node identifier of each node of node order set 455a in field 702b and a corresponding sequence number in field 702a. In the illustrative example, nodes of node order set 455a are sequentially inserted into field 702b such that each node is associated with a sequence number of field 702a corresponding to the position of the node in table 700. Particularly, sequence numbers of 1 through 11 are respectively associated with each of the graph nodes in order in which the nodes are positioned in node order set 455a.

Figure 8:
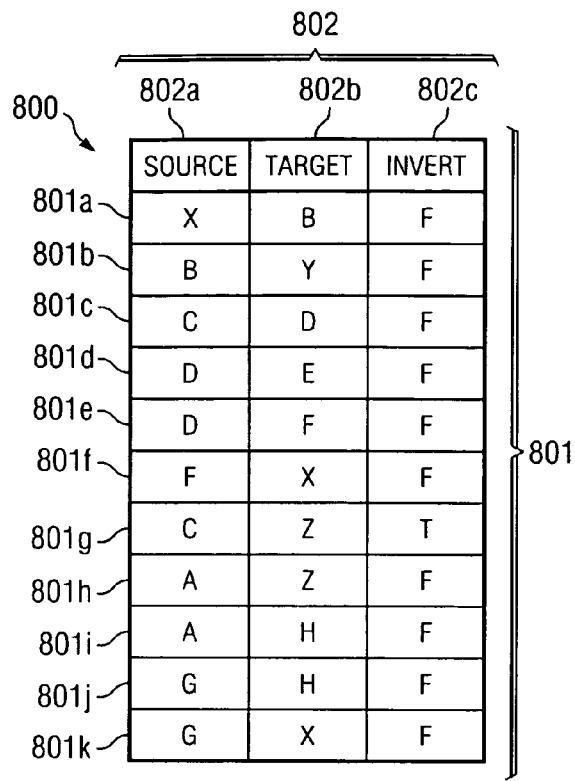
FIG. 8 is a diagrammatic illustration of a table having the node connectivity data of the table shown in FIG. 3 and an inversion value in accordance with a preferred embodiment of the present invention.

One or more edges are identified for inversion such that the number of upward directed edges is minimized. FIG. 8 is a diagrammatic illustration of table 800 having the node connectivity data of table 300 of FIG. 3 and an inversion value in accordance with a preferred embodiment of the present invention. Table 800 has records 801a–801k each associated with a graph edge. Node connectivity of the graph is defined by edge pairs of fields 802a and 802b. Particularly, a source node of an edge of a record is stored in field 802a, and a target node of the corresponding edge is stored in field 802b. The node connectivity defined by fields 802a and 802b is identical to the node connectivity of table 300 in FIG. 3. Additionally, table 800 includes inversion field 802c that stores a value indicating whether the edge of the associated record is to be inverted. In the illustrative example, a Boolean value of false (F) in inversion field 802c indicates that the edge of the corresponding record is not to be inverted, that is the edge is to be graphed in a downward direction. A Boolean value of true (T) indicates that the edge is to be inverted.

The graphing application evaluates edges for inversion by comparing the sequence numbers of the source and target nodes of each edge. An edge (excluding nested edges and loops) is identified for inversion if the source node sequence number is greater than the target node sequence number. For example, the edge defined by fields 802a and 802b of record 801a is edge (X,B). The sequence number of node 420 (node X) is 5, and the sequence number of node 402 (node B) is 7. Thus, the source node sequence number of edge (X,B) is less than the target node sequence number of edge (X,B). Hence, edge (X,B) is not required to be inverted and record 801a has a value of false in field 802c. Each remaining edge of table 800 is evaluated in a similar manner. For example, edge (C,Z) of record 801g is identified as an inverted edge. The sequence number of source node 403 (node C) is 6, and the sequence number of target node 422 (node Z) is 2. Thus, the source node sequence number is greater than the target node sequence number, and a value of true is inserted in field 802c of record 801g. All other edges of table 800 have a source node sequence number less than the target node sequence number thus indicating that graph 400 may be plotted with a single edge—edge (C,Z) in the described example—inverted.

Figure 9:
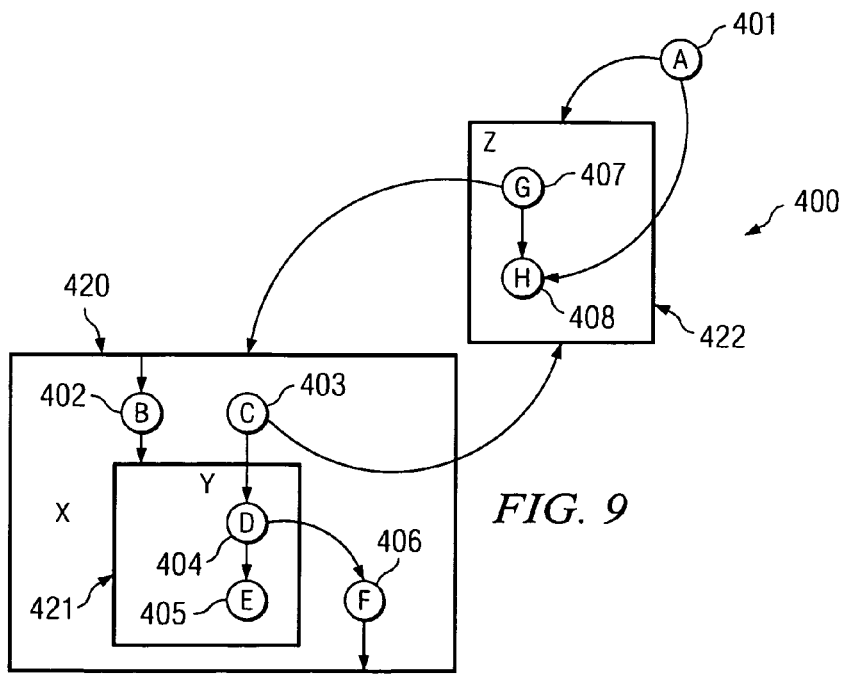
FIG. 9 is a diagrammatic illustration of a graph plotted in accordance with the inversion values derived from the sequence numbers of the generated node order set in accordance with a preferred embodiment of the present invention.

The graphing application may then read table 800 and the vertical direction of graph edges is derived from the inversion values of field 802c. FIG. 9 is a diagrammatic illustration of graph 900 plotted in accordance with the inversion values derived from the sequence numbers of node order set 455*a*. The inversion values of table 800 restrict the relative vertical positioning among the nodes of the graph such that the graph is plotted with the minimum number of upward flowing edges.

Thus, the present invention provides a graphing application that determines vertical directions of edges for minimizing the number of upward directed edges in a cyclic compound directed graph. Zero (in the case where no cycles exist) or more graph edges are identified for inversion such that the graph may be plotted with the number of inverted edges reduced. Thus, a graph may be plotted with a general top-down flow thereby improving the readability and aesthetic appeal of the graph.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of determining an edge for inversion in a cyclic compound directed graph, comprising:
   evaluating a plurality of graph nodes of a graph for generation of a first node order subset pair;
   determining the graph requires recursive evaluation for completing node ordering of the plurality of graph nodes;
   dividing the graph into a plurality of graph partitions; and
   generating respective node order subset pairs of the graph partitions.

2. The method of claim 1, wherein the step of evaluating further includes:
   identifying a removable sink node of the graph;
   removing the removable sink node from the graph; and
   appending a designation associated with the removable sink node in a first node order subset of the first node order subset pair.

3. The method of claim 2, wherein the steps of identifying and removing are repeated until no removable sink nodes remain in the graph.

4. The method of claim 2, wherein the step of evaluating further includes:
   identifying a removable source node of the graph;
   removing the removable source node from the graph, and
   appending a designation associated with the removable source node in a second node order subset of the first node order subset pair.

5. The method of claim 4, wherein the steps of identifying and removing the removable source node are repeated until no removable source nodes remain in the graph.

6. The method of claim 4, wherein:
   the subsets of each subset pair are respectively concatenated, results of the concatentation of subset pairs respectively associated with the partitions are appended to the second node order subset; and
   the first subset and the second subset are concatenated, after said results are appended to provide a node order set for use in determining an edge for inversion.

7. A computer program product in a computer readable medium for identifying a graph edge for inversion in a cyclic compound directed graph, the computer program product comprising:
   first instructions for receiving an input graph, wherein the input graph is a data structure defining a plurality of graph edges, each comprising a respective source node and a target node;
   second instructions for initializing a first subset pair and iteratively identifying and removing removable sink nodes and removable source nodes from the input graph, the removable sink nodes recorded in a first subset of the first subset pair and the removable source nodes recorded in a second subset of the first subset pair;
   third instructions, responsive to removal of the removable sink nodes and removable source nodes by the second instructions, that identify remaining graph elements;
   fourth instructions, responsive to the third instructions identifying the remaining graph elements, adapted to divide the remaining graph elements into graph partitions, wherein the second instructions initialize and record removable sink nodes and removable source nodes in respective subset pairs for each of the graph partitions;
   fifth instructions for generating a node order set including each node of the graph, wherein the node order set is generated from the first subset pair and the subset pairs associated with the partitions;
   sixth instructions for associating a respective sequence number with each of the nodes of the node order set; and
   seventh instructions for comparing a sequence number of a source node of a first edge defined in a record of the data structure with a sequence number of a target node of the first edge, the seventh instructions, responsive to determining that the sequence number of the source node of the first edge is larger than the sequence number of the target node of the first edge, identify the first edge as an inversion edge.

8. The computer program product of claim 7, wherein the remaining graph elements include at least two top-level subgraph nodes.

9. The computer program product of claim 7, further including:
   fifth instructions that concatenate respective subsets of each subset pair.

10. The computer program product of claim 9, wherein results of the concatenation of subset pain associated with the partitions are appended to the second subset.

11. The computer program product of claim 10, wherein the first subset and the second subset are concatenated after appendage of the concatenation results.

12. The computer program product of claim 7, wherein to seventh instructions, responsive to identifying the first edge as an inversion edge, insert an asserted inversion value into the record.

13. The computer program product of claim 7, wherein:
said seventh instructions, responsive to determining that the sequence number of the source node of the first edge is less than the sequence number of the target node of the first edge, identify to first edge as a non-inverted edge.

14. The computer program product of claim 13, wherein the seventh instructions, responsive to identifying the first edge as a non-inverted edge, insert a non-asserted inversion value into the record.

15. A method of determining an edge for inversion in a cyclic compound directed graph, said method comprising the steps of:
receiving an input graph comprising a data structure defining a plurality of graph edges, each comprising a respective source node and a target node;
evaluating a plurality of graph nodes of the input graph in order to generate a first node order subset pair;
dividing the input graph into a plurality of partitions;
generating a node order subset pair corresponding to each of the graph partitions;
generating a node order set including each node of the input graph, wherein the node order set is generated from the first subset pair and from the subset pairs corresponding to the partitions, a sequence number being associated with each of the nodes of the node order set; and
comparing the sequence number of a source node of a first edge defined in a record of the data structure with a sequence number of a target node of the first edge, in order to identify the first edge as an inversion edge when the sequence number of the first edge source node is larger than the sequence number of the first edge target node.

16. The method of claim 15, wherein:
in response to identifying the first edge as an inversion edge, an asserted inversion value is inserted into the record.

17. The method of claim 15, wherein the input graph is a data structure defining a plurality of graph edges, each comprising a respective source node and a target node, and the method further includes the step of:
comparing a sequence number of a source node of a first edge defined in a record of the data structure with a sequence number of a target node of the first edge, and responsive to determining that the sequence number of the source node of the first edge is less than the sequence number of the target node of the first edge, identifying the first edge as a non-inverted edge.

18. The method of claim 17, wherein:
in response to identifying the first edge as a non-inverted edge, a non-asserted inversion value is inserted into the record.

\* \* \* \* \*

UNITED STATES PATENT AND TRADEMARK OFFICE
CERTIFICATE OF CORRECTION

PATENT NO. : 7,102,641 B2 Page 1 of 1
APPLICATION NO. : 10/811742
DATED : September 5, 2006
INVENTOR(S) : Hudson, Jr.

It is certified that error appears in the above-identified patent and that said Letters Patent is hereby corrected as shown below:

Col. 16, line 63: after "subset" delete "pain" and insert --pairs--.

Signed and Sealed this

Nineteenth Day of December, 2006

JON W. DUDAS
*Director of the United States Patent and Trademark Office*